Jan. 12, 1937.  C. H. FERRELLE  2,067,661
AUTOMOBILE LUNCH SUPPORT
Filed Nov. 21, 1934   2 Sheets-Sheet 1
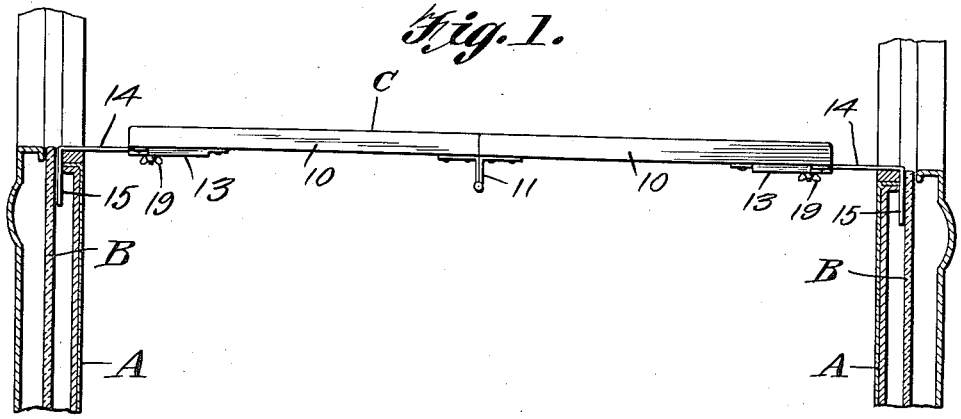
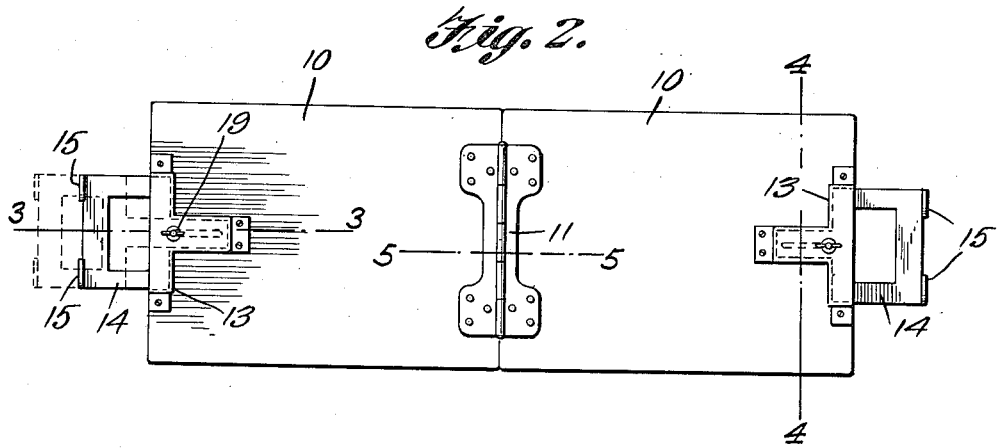
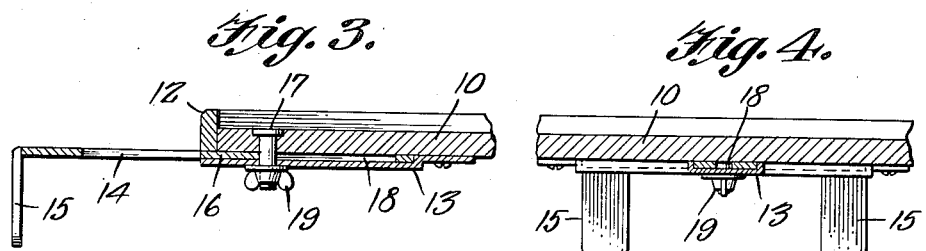
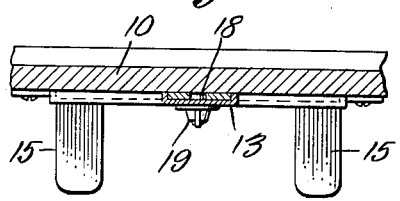
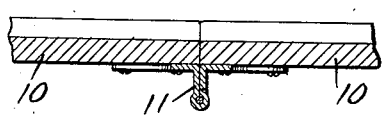
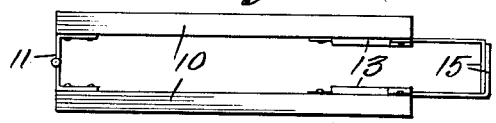
Charles H. Ferrelle,
INVENTOR
BY Victor J. Evans & Co.
ATTORNEY
WITNESS:

Jan. 12, 1937.　　　　C. H. FERRELLE　　　　2,067,661
AUTOMOBILE LUNCH SUPPORT
Filed Nov. 21, 1934　　　　2 Sheets-Sheet 2
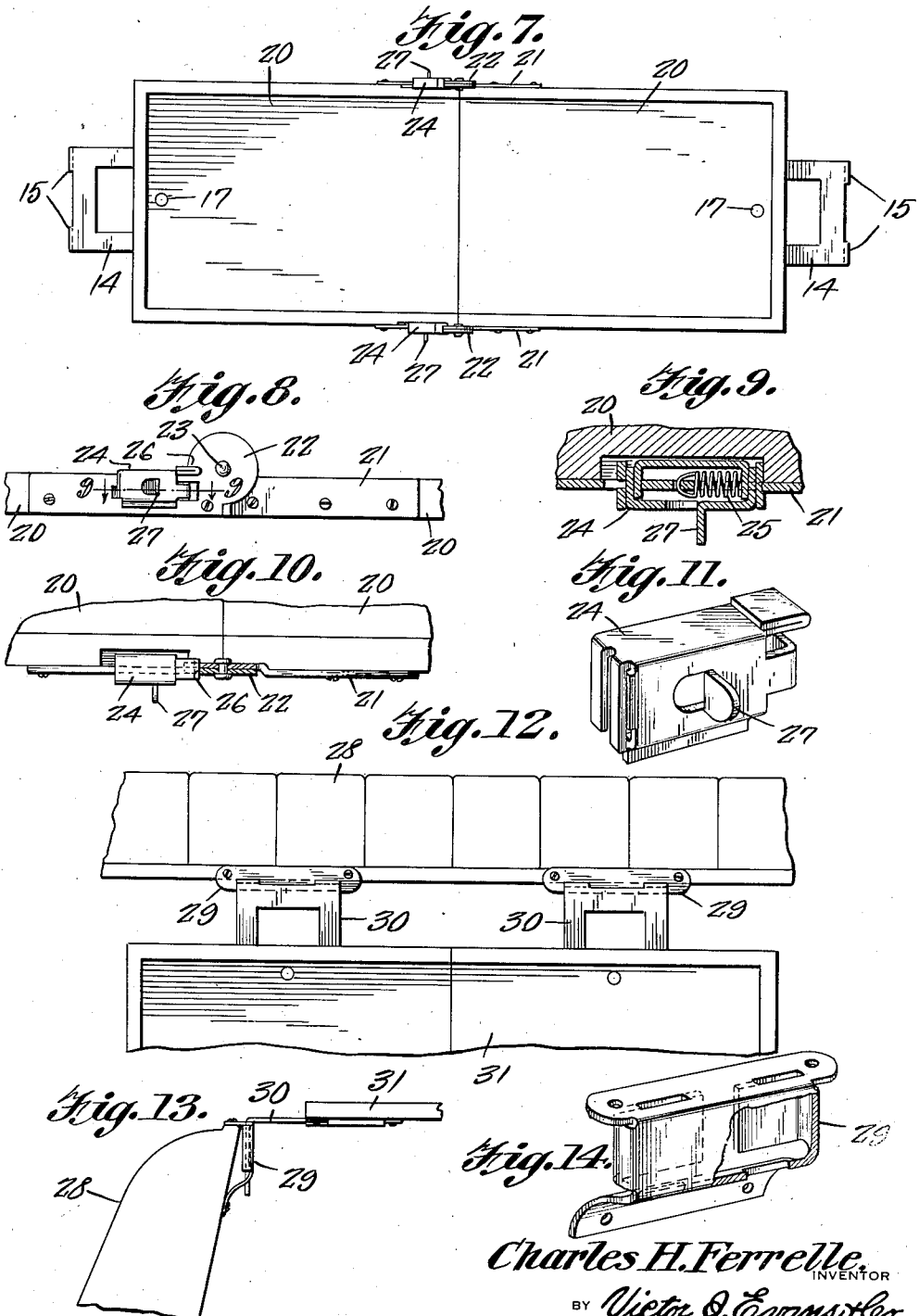
Charles H. Ferrelle,
INVENTOR
BY Victor J. Evans & Co.
ATTORNEY Patented Jan. 12, 1937

2,067,661

UNITED STATES PATENT OFFICE 2,067,661

AUTOMOBILE LUNCH SUPPORT

Charles H. Ferrelle, Savannah, Ga.

Application November 21, 1934, Serial No. 754,136

1 Claim. (Cl. 311—21)

The invention relates to an automobile accessory and especially to a lunch board or the like for an automobile.

The primary object of the invention is the provision of a device of this character, wherein a board, tray or the like is so constructed that it can be disposed in position interiorly of an automobile for the serving of foods, drinks or the like, the device when not in use being susceptible of collapsing or folding, so that it can be stored within the automobile in the least possible space and is handy for use at any time.

Another object of the invention is the provision of a device of this character, wherein the mounting of the same within the automobile is such that it will be sustained firm and rigid for the serving of foodstuffs, liquids or the like and is susceptible of adjustment to accommodate itself to the automobile for the convenient placing of the same in position for use.

A further object of the invention is the provision of a device of this character, wherein the supporting body, such as a tray, board or the like, is in sections, these being hinged for the folding and unfolding thereof, and marginally of such board, tray or the like is a rim which avoids the sliding of the service pieces therefrom when placed thereon while the board, tray or the like is in use.

A still further object of the invention is the provision of a device of this character which is extremely simple in construction, thoroughly reliable and efficient in its purposes, light in weight, yet strong, durable, readily and easily set up for use and knocked down for storage, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary vertical sectional view through the doors of an automobile body, showing the device constructed in accordance with the invention in place for use.

Figure 2 is a bottom plan view.

Figure 3 is an enlarged fragmentary vertical longitudinal sectional view taken on the line 3—3 of Figure 2.

Figure 4 is a fragmentary vertical transverse sectional view taken on the line 4—4 of Figure 2.

Figure 5 is a fragmentary vertical sectional view taken on the line 5—5 of Figure 2.

Figure 6 is a side elevation showing the device folded and detached.

Figure 7 is a plan view of a slight modification.

Figure 8 is a fragmentary side elevation thereof.

Figure 9 is a sectional view on the line 9—9 of Figure 8 looking in the direction of the arrows.

Figure 10 is a fragmentary top plan view partly in section.

Figure 11 is a perspective view of one of the latching members.

Figure 12 is a fragmentary top edge view of a seat back for an automobile, showing a further modified form of the device mounted thereon.

Figure 13 is a fragmentary end elevation.

Figure 14 is a perspective view of the socket piece as employed with the modified form shown in Figures 12 and 13 and the same being partly broken away.

Similar reference characters indicate corresponding parts throughout the several views in the drawings.

Referring to the drawings in detail, particularly Figures 1 to 6 inclusive, A designates a portion of each door of an automobile and that portion accommodating the sliding glass window B. These doors in the body of the automobile are arranged opposite each other, as is conventional, while C designates the lunch board, tray or the like embodying the present invention, it comprising a pair of flat sections 10, preferably made from wood, although the same may be made from metal, fibrous material or any suitable material serviceable in the use thereof. Connecting the sections 10 at adjacent meeting ends is a hinge 11 so that the sections can be folded when not in use or unfolded for use. The unfolded positions of the sections 10 are shown in Figures 1 and 2 of the drawings. These sections 10 are matched with respect to each other and carry at their marginal edges an upstanding rim 12 so that articles placed upon the board, tray or the like cannot fall or slide therefrom when such board, tray or the like is in use.

Secured to the under sides of the sections 10 at their outer ends are socketed guide pieces 13 for accommodating adjustable cleats 14 having the outer right-angular retaining tongues 15 and inner slotted stems 16 slidably fitted within the pieces 13. The sections 10 carry clamping bolts 17, these being engaged in the slots 18 and the stems 16 of said cleats and provided with winged nuts 19 so that the cleats 14 can be made secure in adjusted position to vary the range on the mounting of the board, tray or the like, which mounting is had by engaging the cleats in the slots for the windows B in the doors A, as illustrated in Figure 1 of the drawings. In this position the board, tray or the like is set for use in serving foods or liquids interiorly of the automobile.

When the board, tray or the like is not in use the sections 10 are folded through the instrumentality of the hinge 11 to bring the same into the position as shown in Figure 6 of the drawings, whence such board, tray or the like can be conveniently stored in the least possible space to have it handy for use.

The tongues 15 are inserted in the slots or clearances for the windows B in the doors A of the automobile when the tray, board or the like is set up for use as before described.

In Figures 7 to 11 inclusive of the drawings there is shown a modified form of the invention, wherein the sections 20 are swingingly connected at their inner meeting ends by edge hinges 21, these having the offset pivot eyes 22 for the hinge pivots 23. Upon one leaf of each hinge 21 is fitted a sliding latch 24 confining therein a spring 25 which urges the said latch 24 to latching position for engaging suitable notches 26 provided in the eyes 22 of the hinge 21 so as to lock the hinges against swinging action of the sections 20 as such sections unfold for the use of the board, tray or the like. The sliding latch 24 is provided with a finger hold or grip 27 for the manual actuation thereof to releasing position.

In Figures 12 to 14 inclusive of the drawings there is shown a further modification of the invention, wherein upon the back of an automobile seat, a portion of the latter being indicated at 28, is mounted a pair of double socketed pieces 29 for the removable engagement therein of substantially L-shaped brackets 30, these being adjustably carried by the sections 31 of a tray, board or the like which is of the folding type as hereinbefore set forth, so that this tray, board or the like can be supported horizontally at the rear of the back of the seat 28 for use in serving foods and liquids.

While there has been described the mounting of the tray, board or the like in specific ways, it is to be understood that such board, tray or the like can be otherwise mounted interiorly of the body of the automobile for the use of such board, tray or the like.

What is claimed is:

The combination with a foldable shelf-like support, of substantially T-shaped guide pieces fixed to the support at opposite ends thereof and each having a socketed cross head and stem, the cross head having its socket opening outward and being flush with the end edge of the support next thereto, flat cleats received in said guide pieces and having slotted extensions fitting the stems thereof, the cleats and cross heads of said guide pieces being relatively wide, headed bolts passed through the support and received in the slots in said extension, winged nuts engaged on said bolts for the fastening of the cleats adjusted relative to the guide pieces, and tongues turned from said cleats at right angles thereto.

CHARLES H. FERRELLE.